(12) United States Patent
Myers

(10) Patent No.: US 7,872,645 B2
(45) Date of Patent: Jan. 18, 2011

(54) ON-CHIP TEST SYSTEM AND METHOD FOR ACTIVE PIXEL SENSOR ARRAYS

(75) Inventor: Charles Grant Myers, Corvallis, OR (US)

(73) Assignee: Aptina Imaging Corporation, Grand Cayman (KY)

( * ) Notice: Subject to any disclaimer, the term of this patent is extended or adjusted under 35 U.S.C. 154(b) by 1034 days.

(21) Appl. No.: 11/648,456

(22) Filed: Dec. 28, 2006

(65) Prior Publication Data

US 2008/0158363 A1     Jul. 3, 2008

(51) Int. Cl.
   *G09G 5/00* (2006.01)
(52) U.S. Cl. .............. 345/207; 345/204; 250/208.1; 324/765; 324/767; 348/180; 348/308

(58) Field of Classification Search ............... 345/207, 345/204; 348/187, 246, E17.002, 308, 180, 348/181; 324/765–767; 250/208.1
See application file for complete search history.

(56) References Cited

U.S. PATENT DOCUMENTS

| | | | |
|---|---|---|---|
| 6,448,802 B1 * | 9/2002 | Hirt ........................... | 324/765 |
| 6,489,798 B1 * | 12/2002 | Scott-Thomas et al. ..... | 324/765 |
| 6,584,589 B1 * | 6/2003 | Perner et al. ................. | 714/721 |
| 6,734,897 B1 * | 5/2004 | Mentzer ..................... | 348/180 |
| 7,028,240 B1 * | 4/2006 | Bautista et al. ............. | 714/733 |

* cited by examiner

*Primary Examiner*—Quan-Zhen Wang
*Assistant Examiner*—Jennifer T Nguyen
(74) *Attorney, Agent, or Firm*—RatnerPrestia

(57) ABSTRACT

An image sensing chip includes an active pixel sensor array including a plurality of pixels arranged in rows and columns. A built in self test circuit is coupled to the active pixel sensor array. The built in self test circuit includes an output port adapted to be coupled to external circuitry and the built in self test circuit is operable to test the active pixel sensor array and provide the results of the test on the output port.

13 Claims, 10 Drawing Sheets

ON-CHIP TEST SYSTEM AND METHOD FOR ACTIVE PIXEL SENSOR ARRAYS

BACKGROUND OF THE INVENTION

Active pixel sensor arrays contain an array of individual photo sensors that collectively capture digital image data. These sensor arrays, which are commonly referred to as complementary metal oxide semiconductor (CMOS) image sensors since they are commonly fabricated using CMOS processing technology, are used in a wide variety of commonplace consumer electronic devices, such as digital still cameras, digital video cameras, and image copying devices. FIG. 1 is a functional block diagram of a conventional imaging device 100 that includes an active pixel sensor array 102 formed by a plurality of photo sensors or pixels PS arranged in rows and columns. Each pixel PS in a given row is coupled to an associated row line R1-RN and each pixel in a given column is coupled to an associated column line C1-CM.

A row decoder and control circuit 104 provides row activation signals on the row lines R1-RN to sequentially activate a selected row of pixels PS. Column amplifiers 106 develop a differential voltage DV for each activated pixel PS where the differential voltage corresponds to the difference between the voltage on the column line C coupled to that pixel and the voltage on a reference column line CR, which corresponds to the Mth column in the array 102 so this column line is alternatively indicated in parentheses as column line CM. The last column of pixels $PS_{R1M}$-$PS_{RNM}$ is a reference column coupled to reference column line CR, with all these references pixels being suitably covered so that no light from an image being captured is incident upon these reference pixels.

In operation, to capture an image the row decoder and control circuit 102 initially supplies reset signals on the row lines R to reset all the pixels PS. Each pixel PS includes a photo-detector (not shown) that is typically a photo diode PD, and when reset these photo detectors are charged to a maximum voltage. The pixels PS in the array 102 are then exposed to incident light from the image being captured and this incident light discharges the photo detectors of each pixel PS by an amount that is a function of the intensity of the incident light. As a result of this discharge, after the exposure time each pixel PS has a voltage on the corresponding photo detector PS having a value that is a function of the intensity of the incident light.

At this point, the row decoder and control circuit 104 sequentially activates each row of pixels PS, causing each activated pixel to develop a voltage on the corresponding column line C indicating the voltage at the photo detector PS of that pixel. The column amplifiers 106 then amply this voltage on each column line C and output this amplified voltage as a pixel voltage $PV_{NM}$ for each pixel in the activated row. In this way, a pixel voltage $PV_{NM}$ for each pixel in the array 102 is read out of the array 102. As will be understood by those skilled in the art, to reduce noise and improve the accuracy of the pixel voltages PV read from conventional arrays 102, a differential approach may be utilized where each pixel voltage is a differential voltage defined by the voltage on a given column line C and a voltage on a reference column line coupled to reference pixels contained in each row of the array, as is described in more detail in commonly owned U.S. patent application Ser. No. 11/601,346 entitled DIM ROW SUPPRESSION SYSTEM AND METHOD FOR ACTIVE PIXEL SENSOR ARRAYS to Mentzer ("Mentzer"), which is incorporated herein by reference. For ease of description, the pixels voltage PV from the column amplifiers 106 are assumed in the following description to correspond simply to the voltages developed by activate pixels PS on the associated column lines C.

Regardless of how the exact way in which the pixel voltages $PV_{NM}$ are developed, these voltages are analog voltages and must then be digitized and stored to complete the capture of the image. To do this, an analog-to-digital (A/D) converter (not shown) converts each analog pixel voltage PV into a corresponding digital value having a number of bits. These digital values from all the pixels PX in the active pixel sensor array 102 collectively form a captured digital image file. This digital image file may then typically be viewed on the imaging device 100 containing the active pixel sensor array 102, such as where the device is a digital camera, or the files may be transferred to another device such as a printer and used to generate a hard copy of the captured image, or transferred to a computer or television for viewing on a suitable display.

As with most any type of electronic device, the active pixel sensor array 102 must be tested after manufacture of the array to verify proper operation. Typically, two types of errors are detected during testing of active pixel sensor arrays 102. The first type of error results from a pixel PS that is not operating properly, such as a "hot pixel" or a "stuck-at" pixel. A stuck-at pixel is a pixel PS that is stuck at a particular voltage, and thus regardless of incident light upon the photo detector of that pixel the pixel, when activated, provides the same "stuck-at" voltage value on the column line C. A hot pixel is a pixel PS having a high leakage current that causes the photo detector to discharge even when there is no light incident upon the photo detector. Thus, if a pixel PS is a hot or stuck-at pixel, the pixel provides a voltage that does not accurately indicate the intensity of light incident upon that pixel.

The second type of error is generally referred to as "fixed-pattern" error. This type of error can be either a row-wise or column-wise error for an entire row or column of pixels in the image sensor array. One example of a fixed-pattern error is dim row error that results when the previously mentioned differential approach is used. When the reference pixel or pixels in a given row is a hot pixel, such a hot pixel will result in an erroneous voltage from the reference pixel, which ideally provides a maximum voltage equal to the reset voltage. This erroneous voltage on the reference column line will then be subtracted from the voltage on the column line C for every other pixel in the associated row. Since the voltage on the reference column line is less than the ideal maximum value, the differential voltage values from the associated entire row of pixels PS will be less than desired, resulting in the row being too dim relative to neighboring rows, as will be understood by those skilled in the art. Other errors could result in an entire row of pixels being too bright relative to neighboring rows, or an entire column of pixels being too dim or bright. Such bright rows or columns of pixels are very noticeable when viewing a captured digital image and are therefore undesirable.

In conventional testing of active pixel sensor arrays 102, an external tester (not shown) controls the array or the imaging device 100, such as a cell phone or digital camera, containing the array to test proper operation of the array. To test the active pixel sensor array 102, a test image (not shown) is positioned within a field of view of the active pixel sensor array. The pixels PS in the array 102 are reset, meaning each photo detector is charged, and the image captured by exposing the test image to the pixels in the array for an appropriate exposure time. Typically, the test image is a black image. Data captured by the active pixel sensor array 102 is then provided to the external tester which analyzes the data to detect erroneous pixels in the array, such as hot pixels or stuck at pixels as previously discussed. In addition, the tester analyzes data to detect fixed pattern errors such dim rows or columns or overly bright rows or columns.

External testers are slow in that the rate at which data can be transferred from the active pixel sensor array 102 to the tester and thereafter analyzed by the tester is sufficiently long that it takes a relatively long time to test each array or device containing that array. Ideally, the test time would be reduced to enable the active pixel sensor arrays and devices containing such arrays to be more quickly tested.

SUMMARY OF THE INVENTION

According to one aspect of the present invention, an image sensing chip includes an active pixel sensor array including a plurality of pixels arranged in rows and columns. A built in self test circuit is coupled to the active pixel sensor array. The built in self test circuit includes an output port adapted to be coupled to external circuitry and the built in self test circuit is operable to test the active pixel sensor array and provide the results of the test on the output port.

DETAILED DESCRIPTION OF PREFERRED EMBODIMENTS

Figure 2:
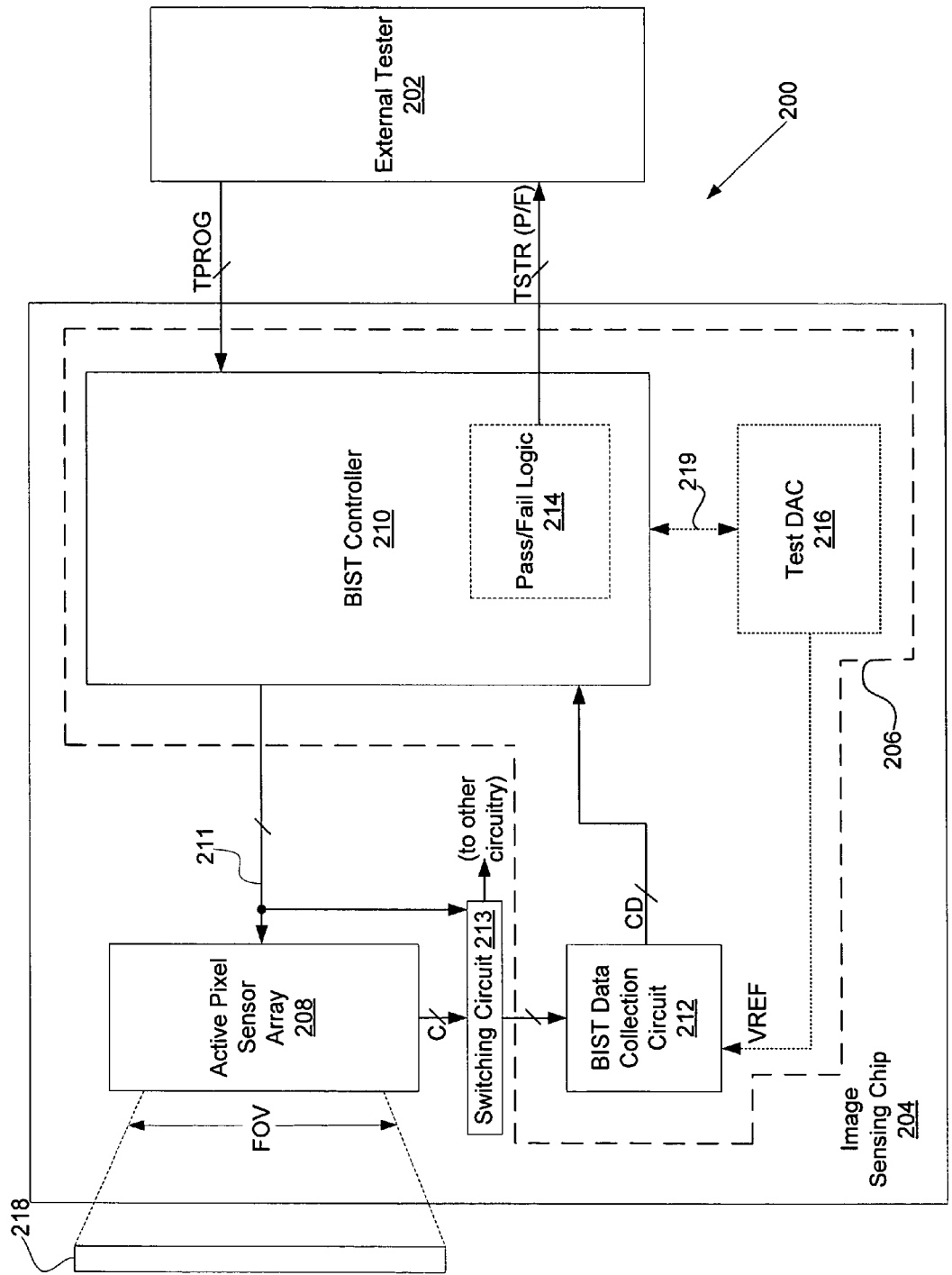
FIG. 2 is a functional block diagram of a test system including an external tester coupled to an image sensing chip containing integrated built in self test (BIST) circuitry for testing an active pixel sensor array on the chip according to one embodiment of the present invention.

FIG. 2 is a functional block diagram of a test system 200 including an external tester 202 coupled to an image sensing chip 204 containing integrated built in self test (BIST) circuitry 206 for testing an active pixel sensor array 208 on the chip according to one embodiment of the present invention. The BIST circuitry 206 is contained on the same chip 204 in which the sensor array 208 is formed, where the term chip is used to mean a single piece of semiconductor material in which electronic components are formed or one or more chips contained within a single package. By locating the BIST circuitry 206 in the same chip 204 as the sensor array 208, the pixels (not shown) in the array can be tested at a much faster rate than is possible with only an external tester. This is true because, for example, only a single bit may now be read from the chip 204 by the external tester 202 to determine whether the sensor array 208 is functioning properly.

Being positioned adjacent the sensor array 208 on the same chip also enables the BIST circuitry 206 to more quickly read image data captured by the pixels of the array due to the reduced distances and improved electrical characteristics of conductive lines interconnecting the two. For example, such conductive lines between the BIST circuitry 206 and sensor array 208 are much shorter and have much lower capacitances and inductances when compared to conductive paths required to interconnect the array and chip 204 to the external tester 202. In addition, the external tester 202 is typically a relatively expensive piece of equipment and if a higher data transfer rate to the tester is desired a new tester must be purchased. With the approach of the embodiment of FIG. 1, the data transferred between the chip 204 and external tester 202 may be greatly reduced, which reduces the test time required by the tester to verify proper operation of the array 208 and enables older testers to continue to be used to efficiently test chips 204. Finally, other embodiments of the present invention utilize relatively simple circuitry to form the BIST circuitry 206. Such relatively simple circuitry for the BIST circuitry 206 consumes a relatively small area on the chip 204 while at the same time providing comprehensive testing of the pixels in the sensory array 208, as will be explained in more detail below.

Figure 1:
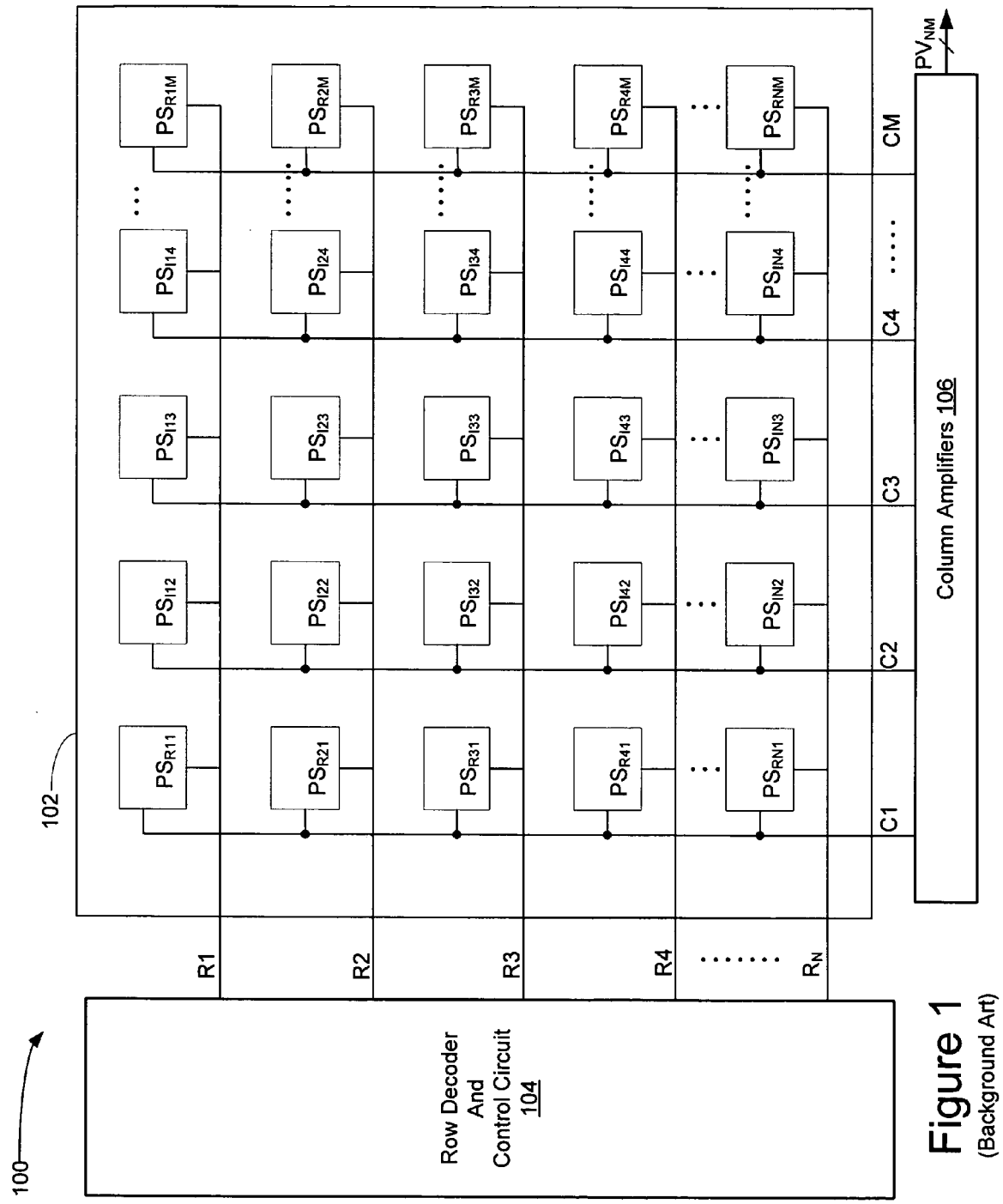
FIG. 1 is a functional block diagram of an imaging device including a conventional active pixel sensor array.

In the embodiment of FIG. 1, the BIST circuitry 206 includes a BIST controller 210 that controls the overall operation of the testing of the active pixel sensor array 208. More specifically, the BIST controller 210 applies appropriate control signals 211 to control the operation of the active pixel sensor array 208 and other components during testing of the array 208. Thus, for example, the control signals 211 would include, for example, activation and reset signals applied on the row lines (not shown) of the array 208 to control activation and reset of the pixels PS (not shown) in the array, as previously discussed with reference to FIG. 1. A switching circuit 213 receives data in the form of voltages provided on column lines C from activated pixels in the active pixel sensor array 208. The column lines C of the active pixel sensor array 208 correspond to the plurality of column lines C1-CM previously discussed with reference to the array 102 of FIG. 1.

During testing of the array 208, the switching circuit 213 operates in a test mode to provide the data on the column lines to C to a BIST data collection circuit 212. The BIST data collection circuit 212 compares the voltage on each column line C to a reference voltage VREF and outputs collected data signals CD corresponding to the results of each of these comparisons to the BIST controller 210. During normal operation of the image sensing chip 204 when the array 208 is not being tested, the switching circuit 213 operates in a normal mode to provide the data on the column lines C to other circuitry (not shown) in the image sensing device. The BIST controller 210 generates a suitable control signal 211 to place the switching circuit 213 in the test mode or normal mode of operation.

The BIST controller 210 also includes pass/fail logic 214 that processes the collected data signals CD and generates a test results signal TSTR indicating the result of whether the active pixel sensor array 208 has passed or failed the test currently being performed on the array. The specific information contained in the test results signal TSTR may vary in different embodiments of the present invention. In one embodiment, the pass/fail logic 214 generates a pass/fail signal P/F for the test results signal TSTR simply indicating whether the active pixel sensor array 208 has passed or failed a current test. The pass/fail signal P/F is supplied through an output port to the external tester 202 to enable the external tester to determine whether the active pixel sensor array 208 has passed or failed the current test being performed on the array. The external tester 202 may also apply test programming signals TPROG to the BIST controller 210 through an input port to control or vary the specific tests performed by the controller on the active pixel sensor array 208.

In operation, to test the active pixel sensor array 208 the image sensing chip 204 is properly positioned to place a test image 218 within a field of view FOV of the active pixel sensor array 208. As previously mentioned, the test image 218 is typically a black image but other images may also be utilized to perform different types of testing on the active pixel sensor array 208. The field of view FOV of the active pixel sensor array defines a region in which incident light from an image may be sensed by the array, as will be appreciated by those skilled in the art.

During testing, the BIST controller 210 develops the control signals 211 to control the overall operation of the BIST circuitry 206 and active pixel sensor array 208. The BIST controller 210 may initiate the start of a test upon the occurrence of a particular condition, such as power-up of the image sensing chip 204. Alternatively, the BIST controller 210 may initiate a test in response to the test programming signals TPROG from the external tester 202. Regardless of how a given test is initiated, the BIST controller 210 first resets the array 208, meaning the pixels (not shown) of the array are reset and the photo detectors (not shown) of such pixels are thereby charged to maximum voltage values. The pixels of the array 208 are then exposed to incident light from the test image 218 for the desired exposure time.

The BIST controller 210 also develops the control signals 211 to place the switching circuit 213 in the test mode of operation so that the data captured by each of the pixels in the form of a voltage on the photo detector of each pixel may then be sequentially read out of the array 208 one row at a time. The BIST controller 210 sequentially activates the rows of pixels in the array 208 to read the data out of the array one row at a time. As each row of pixels is activated, each of the pixels in the row develops a corresponding voltage on the associated column line C. The voltages on the column lines C are supplied through the switching circuit 213 to the BIST data collection circuit 212, which compares the voltage on each column line C to the reference voltage VREF and outputs to the BIST controller 210 the corresponding collected data signals CD indicating the results of each of these comparisons.

Each collected data signal CD has a first logic state when the voltage on a given column line C is less than or equal to the reference voltage VREF and a second logic state when the voltage is greater than the reference voltage. In this way, the BIST data collection circuit 212 functions as an analog-to-digital (A/D) converter, converting the analog voltage values on the column lines C into corresponding digital values in the form of the collected data signals CD. The BIST data collection circuit 212 operates in this way for each sequentially activated row of pixels, providing collected data signals CD to the BIST controller 210 for each activated row.

The pass/fail logic 214 in the BIST controller 210 processes the collected data signals CD and determines whether the active pixel sensor array 208 has passed or failed the test. Upon making this determination, the pass/fail logic 214 generates the test results signal TSTR indicating whether the array 208 passed or failed the test. The specific process executed by the pass/fail logic 214 in making this determination will vary depending on the specific test being performed on the sensor array 208. Various embodiments of the pass/fail logic 214 and the corresponding functional tests performed by these embodiments will be described in more detail below with reference to FIGS. 4-9. The specific information contained in the TSTR signals may also vary depending on the type of test being performed. For example, the TSTR signals may be a simple pass/fail flag P/F indicating whether the entire array 208 has passed or failed the test. Alternatively, the TSTR signals could include a P/F flag along with data indicating a row or column number for a row or column of pixels that failed the test, and could also, for example, include the collected data signals CD for this erroneous row or column of pixels.

After receiving the TSTR signals, the external tester 202 may apply TPROG signals to the BIST controller 210 which cause the controller to perform additional tests on the active pixels sensor array 208. The external tester 202 may also provide a visual or auditory indication that the image sensing chip 204 had passed or failed the testing. Appropriate processing of the chip 204 then occurs, such as removal of the chip for further detailed testing at another location where the chip failed the test, or removal of the chip for packaging or other further manufacturing or other steps where the chip passed the test, as will be appreciated by those skilled in the art.

In another embodiment of the present invention, the BIST circuitry 206 further includes a test digital-to-analog converter (DAC) 216 that generates the reference voltage VREF applied to the BIST data collection circuit 212. The BIST controller 210 applies control signals 219 to control the value of the reference voltage VREF generated by the test DAC 216. In this way, the BIST controller 210 may modify the test performed on the array 208 by dynamically adjusting the reference voltage VREF during testing of the array. For example, the test image 218 may be varied to perform different tests on the array 208. Instead of a black test image 218 a white or gray test image could be utilized, with the controller 210 generating the control signals 219 to cause the test DAC 216 to provide the proper reference voltage VREF for each test image. In another embodiment the DAC 216 controls the voltage VREF to detect fixed pattern errors in the sensor array 208, as will be discussed in more detail below with reference to FIG. 8.

Figure 3:
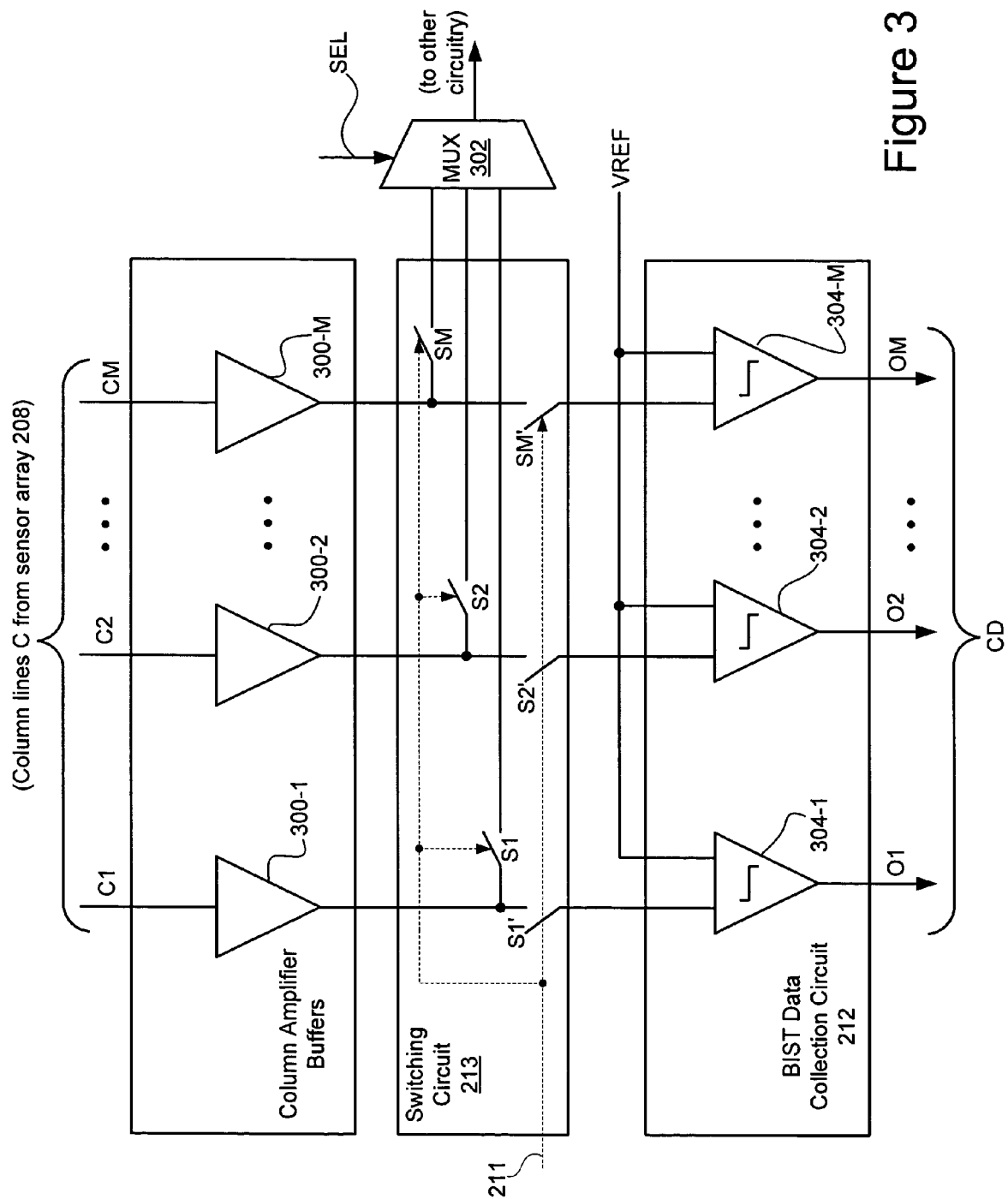
FIG. 3 is a more detailed functional diagram illustrating one embodiment of the BIST data collection circuit of FIG. 2.

FIG. 3 is a more detailed functional diagram illustrating one embodiment of the BIST data collection circuit 212 of FIG. 2. A plurality of column amplifier buffers 300-1 to 300-M are shown coupled to the column lines C1-CM of the array 208, respectively, and may be considered as being part of the array in FIG. 2. Each column amplifier buffer 300 amplifies the voltage on the corresponding column line C and isolates the column line from other circuitry. Outputs from the column amplifier buffers 300 are thus amplified and buffered signals indicating the voltage of an activated a pixel coupled to the corresponding column line C.

The switching circuit 213 includes a plurality of switches S1-SM and S1'-SM' that operate in response to the control signals 211 from the BIST controller 210 of FIG. 2 to appropriately route the signals from the buffers 300. During the normal mode of operation, the control signals 211 close the switches S1-SM so that the signals from the buffers 300 are routed through a multiplexer 302 to other circuitry in the image sensing chip 204 of FIG. 2. The multiplexer 302 may be considered part of the switching circuit 213 although shown outside the box defining this circuit in FIG. 3. The other circuitry controls the multiplexer through selection signals SEL to sequentially read the data on the column lines C being output by the buffers 300 for an active row of pixels. During the normal mode, the control signals 211 open the switches S1'-SM' to isolate the outputs of the buffers 300 from the BIST data collection circuit 212.

During the test mode of operation, the control signals 211 open the switches S1-SM so that the signals from the buffers 300 are isolated from the multiplexer 302 and the other circuitry in the image sensing chip 204. The control signals 211 close the switches S1'-SM' to couple the outputs of the buffers 300 to a first input of plurality of comparators 304-1 to 304-M forming the BIST data collection circuit 212. Each comparator 304 receives the reference voltage VREF on a second input and generates an output O1-OM indicating the result of a comparison between the voltage VREF and the output of the corresponding buffer 300.

In operation, each comparator 304 compares the analog voltage received from the corresponding column amplifier buffer 300 to the reference voltage VREF and generates the corresponding output O indicating the result of this comparison. For each comparator 304, when the analog voltage from the corresponding column amplifier buffer 300 is less than or equal to the reference voltage VREF, the output O from the comparator has a first voltage corresponding to a first logic state. Conversely, when the analog voltage from the corresponding column amplifier 300 is greater than the reference voltage VREF, the output O from the comparator 304 has a second voltage corresponding to a second logic state. The outputs O1-OM from the comparators 304-1 to 304-M collectively form the collected data signals CD (FIG. 2) that are applied to the BIST controller 210, which thereafter processes these signals to detect bad pixels in the sensor array 208 (FIG. 2). The collected data signals CD thus correspond to the outputs from the comparators 304 and accordingly are digital signals. In this way, the comparators 304 perform an analog-to-digital conversion of the analog voltages from the column amplifier buffers 300.

For a given test, either the first or second logic state output from the comparators 304 will correspond to either a pass or a fail condition for the associated pixel. For example, where the test image 218 (FIG. 2) is a black test image, the voltage from the pixels in the array 208 (FIG. 2) should have high values such that the voltages on the column lines C are greater than the reference voltage VREF. Note that the comparators 304 actually compare the reference voltage VREF to the voltages from the column amplifier buffers 300, but for ease of description this latter voltage may simply be referred to as the voltage on the column lines C. Where the pixels are operating properly, each comparator 304 generates an output O having the second logic state, indicating the voltage on the associated column line C is greater than the reference voltage VREF. In contrast, where a given pixel is defective or "bad," the voltage on the associated column line C may be less than the reference voltage VREF, causing the associated comparator 304 to generate the first logic state on its output O. In this way, the outputs O of the comparators 304 indicate whether each pixel in a given activated row of pixels in the array 208 is functioning properly (is a "good" pixel) or whether the pixel is a defective or bad pixel.

Figure 4:
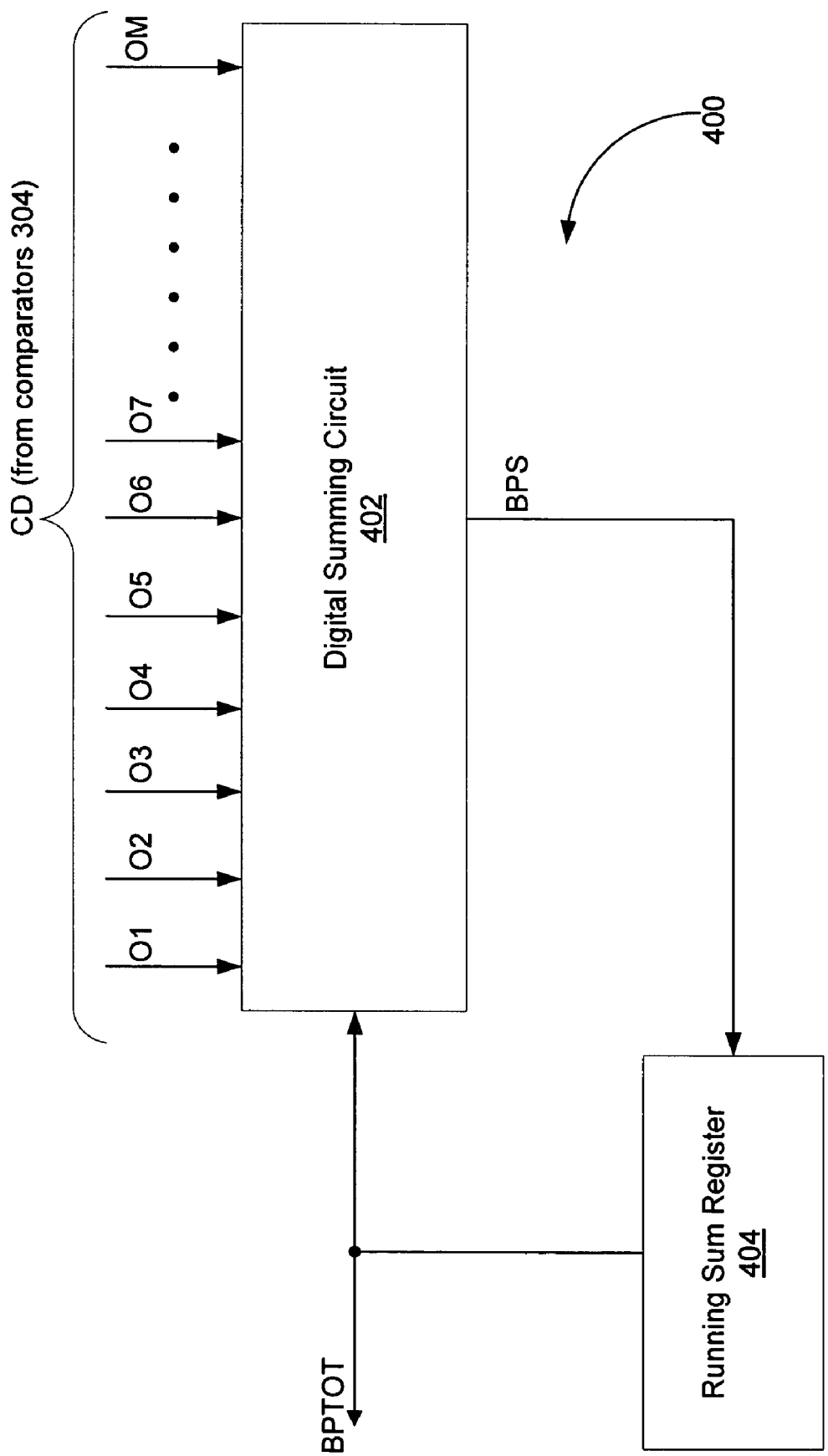
FIG. 4 is a functional block diagram of a pixel-sum bad pixel detection circuit contained in the BIST controller of FIG. 2 according to one embodiment of the present invention.

As previously mentioned, the precise way in which the BIST controller 210 detects defective or bad pixels using the collected data signals CD may vary in different embodiments of the present invention. FIG. 4 is a functional block diagram of a pixel-sum bad pixel detection circuit 400 contained in the BIST controller 210 of FIG. 2 for detecting bad pixels in the active pixel sensor array 208 according to one embodiment of the present invention. The circuit 400 will now be explained with reference to FIGS. 2-4. In this embodiment, as each row of pixels in the array 208 is accessed, the outputs O generated by the comparators 304 in the BIST data collection circuit 212 are supplied to a digital summing circuit 402 as shown in FIG. 3. For each activated row, the digital summing circuit 402 sums the total number of bad pixels contained in that row to generate a bad pixel sum BPS. The bad pixel sum BPS is provided to a running sum register 404 which stores the BPS sum output from the summing circuit 402 for that row.

The digital summing circuit 402 and running sum register 404 continue operating in this manner for each activated row of pixels in the array 208. In this way, the numbers of bad pixels for each row, which corresponds to the BPS sum, are added in the running sum register 404 to generate a bad pixel total BPTOT for all of the rows in the array 208. Once all rows in the array 208 have been activated, the bad pixel total BPTOT equals the total number of bad pixels contained in the array 208. At this pint, the bad pixel total BPTOT is utilized by the pass/fail logic 214 contained in the BIST controller 210 (see FIG. 2) to determine whether the active pixel sensor array 208 passes or fails the test being conducted. For example, assume the array 208 is a 3 megapixel array, meaning there are approximately three million pixels in the array. The pass/fail logic 214 could, for example, determine the array 208 passes the test as long as less than one percent or roughly 30,000 pixels are defective. In this situation, the pass/fail logic 214 determines the array 208 passes the test as long as bad pixel total BPTOT is less than 30,000.

Figure 5:
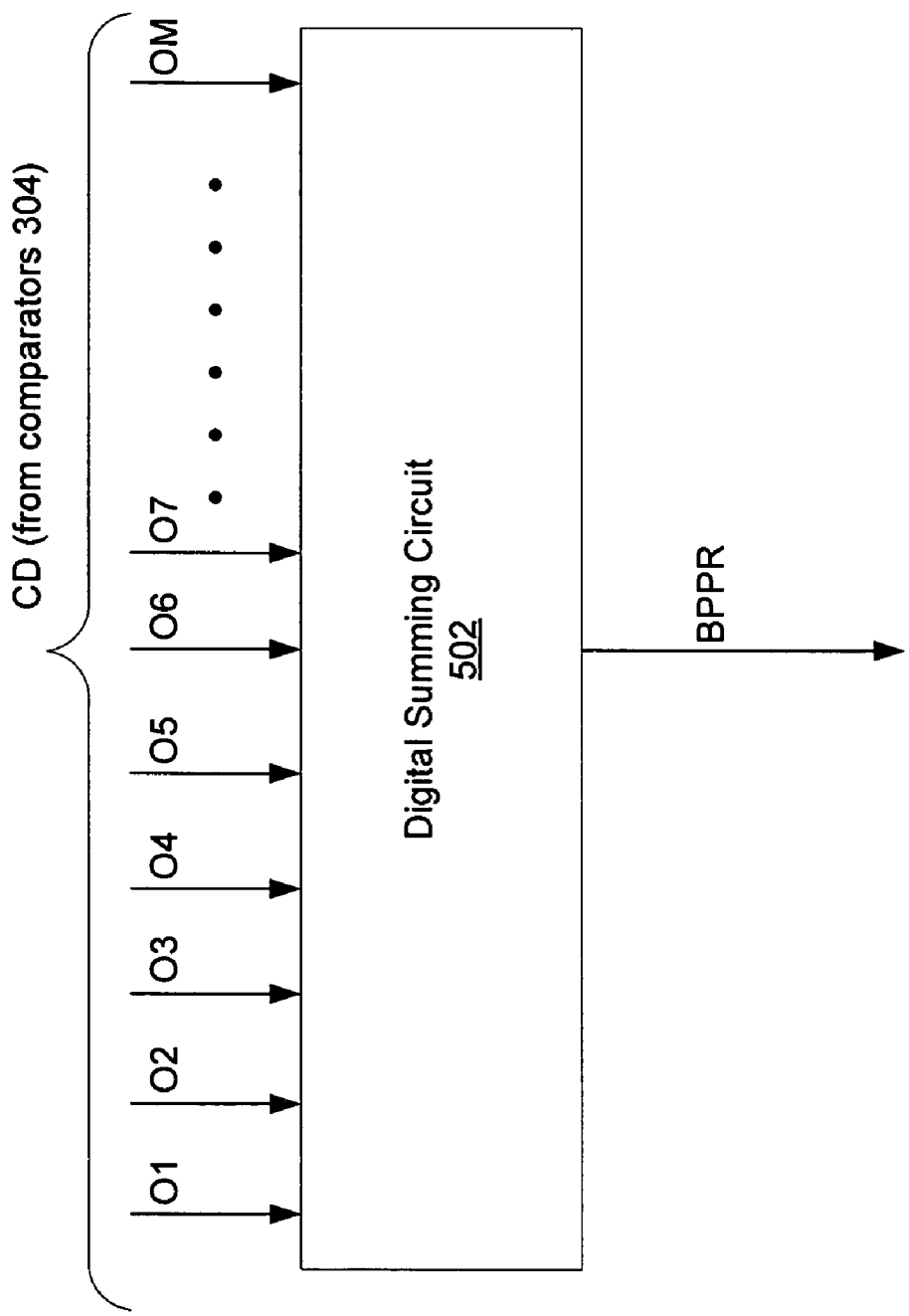
FIG. 5 is a functional block diagram of a row sum bad pixel detection circuit contained in the BIST controller of FIG. 2 according to another embodiment of the present invention.

FIG. 5 is a functional block diagram of a row-sum bad pixel detection circuit 500 contained in the BIST controller 210 of FIG. 2 according to another embodiment of the present invention. The row-sum bad pixel detection circuit 500 includes a digital summing circuit 502 that receives the outputs O from the comparators 304 of FIG. 3. In operation, the digital summing circuit 502 generates a bad pixels per row signal BPPR indicating the number of bad pixels contained in the currently activated row of pixels in the array 208 (FIG. 2). As previously discussed, the logic state of the output O of each comparator 304 (FIG. 3) indicates whether the pixel in the corresponding column is a good or bad pixel.

In this embodiment, the BIST controller 210 (FIG. 2) containing the circuit 500 uses the number of bad pixels in each row, which is given by the bad pixels per row signal BPPR, in determining whether the array 208 passes or fails the test. The pass/fail logic 214 in the BIST controller 210 then uses the BPPR signal in determining whether the array 208 passes or fails the current test being executed. The pass/fail logic 214 compares the BPPR signal for each row in the array 208 to an associated bad pixel threshold value and determines whether BPPR signal is greater than this threshold value. If the BPPR signal is greater than the bad pixel threshold value, then the pass/fail logic 214 determines the current row in the array 208 fails the test. Conversely, if the BPPR signal is less then the bad pixel threshold value the pass/fail logic 214 determines the current row in the array 208 passes the test. The pass/fail logic 214 then generates the TSTR signal indicating the results of the current test and this signal is applied to the external tester 202 for subsequent processing, which may vary. For example, the external tester 202 may determine the array 208 passes the current test only if all rows in the array 208 pass the test, or if less than a specified number of rows fail the test.

Figure 6:
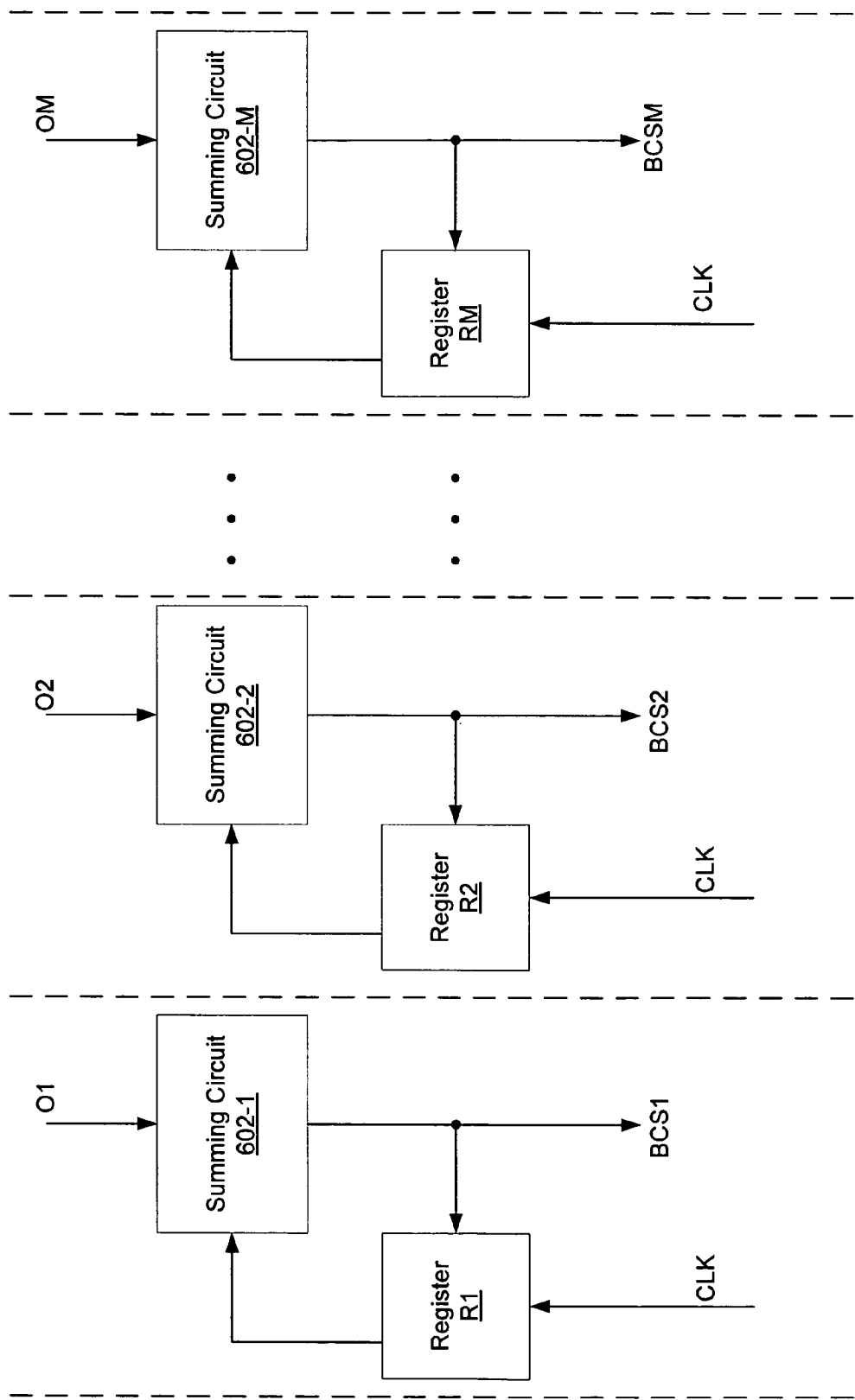
FIG. 6 is a functional block diagram of a column sum bad pixel detection circuit contained in the BIST controller of FIG. 2 according to another embodiment of the present invention.

FIG. 6 is a functional block diagram of a column sum bad pixel detection circuit 600 contained in the BIST controller 210 of FIG. 2 according to another embodiment of the present invention. In this embodiment, a summing circuit 602-1 to 602-M is associated with each column of pixels in the sensor array 208. Each summing circuit 602 receives the output O from the corresponding comparator 304 in the BIST data collection circuit 212 (FIG. 2) and sums this output O from the comparator 304 with an output from an associated register R1-RM to generate a bad column sum signal BCS1-M equal to the sum of these two values. This BCS signal from each summing circuit 602 is input to each register R and clocked into the register responsive to a clock signal CLK. In this way, each register R stores the value of the current BCS signal output by the corresponding summing circuit 602 responsive to the CLK signal.

In operation, circuitry in the BIST controller 210 (FIG. 2) resets each of the registers R1-RM so that each register initially stores a zero value. A first row of pixels in the array 208 (FIG. 2) is thereafter accessed and the comparators 304 (FIG. 3) in the BIST data collection circuit 212 (FIG. 2) generate the corresponding outputs O1-OM. Each summing circuit 602 receives the corresponding output O and sums this output with the value stored in the corresponding register R, which at this point is zero, to generate the corresponding BCS signal. At this point, the CLK signal clocks the current BCS signal from each summing circuit 602 into the corresponding register R. In this way, the registers R contain a running total of bad pixels detected for the associated column of pixels.

Once all rows of pixels have been accessed, each BCS signal indicates the total number bad pixels detected in the corresponding column. At this point, the pass/fail logic 214 (FIG. 2) in the BIST controller 210 (FIG. 2) processes the BCS signals from the summing circuits 602 to determine whether the array 208 has passed or failed the current test, and generates the TSTR signal indicating the results of this determination. Once again, the exact process executed by the pass/fail logic 214 in making this determination may vary. The logic 214 could, for example, determine compare the final BCS signal for each column to a threshold value and determine that column of pixels fails when the BCS signal is greater than the threshold value. The column is deemed to have passed the test when the final BCS signal is less then the threshold value. When the total number of columns that fail the test is less than a maximum threshold value, the logic 214 determines the array 208 has passed the test and generates the corresponding TSTR signal. Conversely, when the total number of columns that fail the test is greater than the maximum threshold value, the logic 214 determines the array 208 has failed the test and applies the corresponding TSTR signal to the external tester 202 which, in turn, takes appropriate actions such as conducting more tests on the array.

Figure 7:
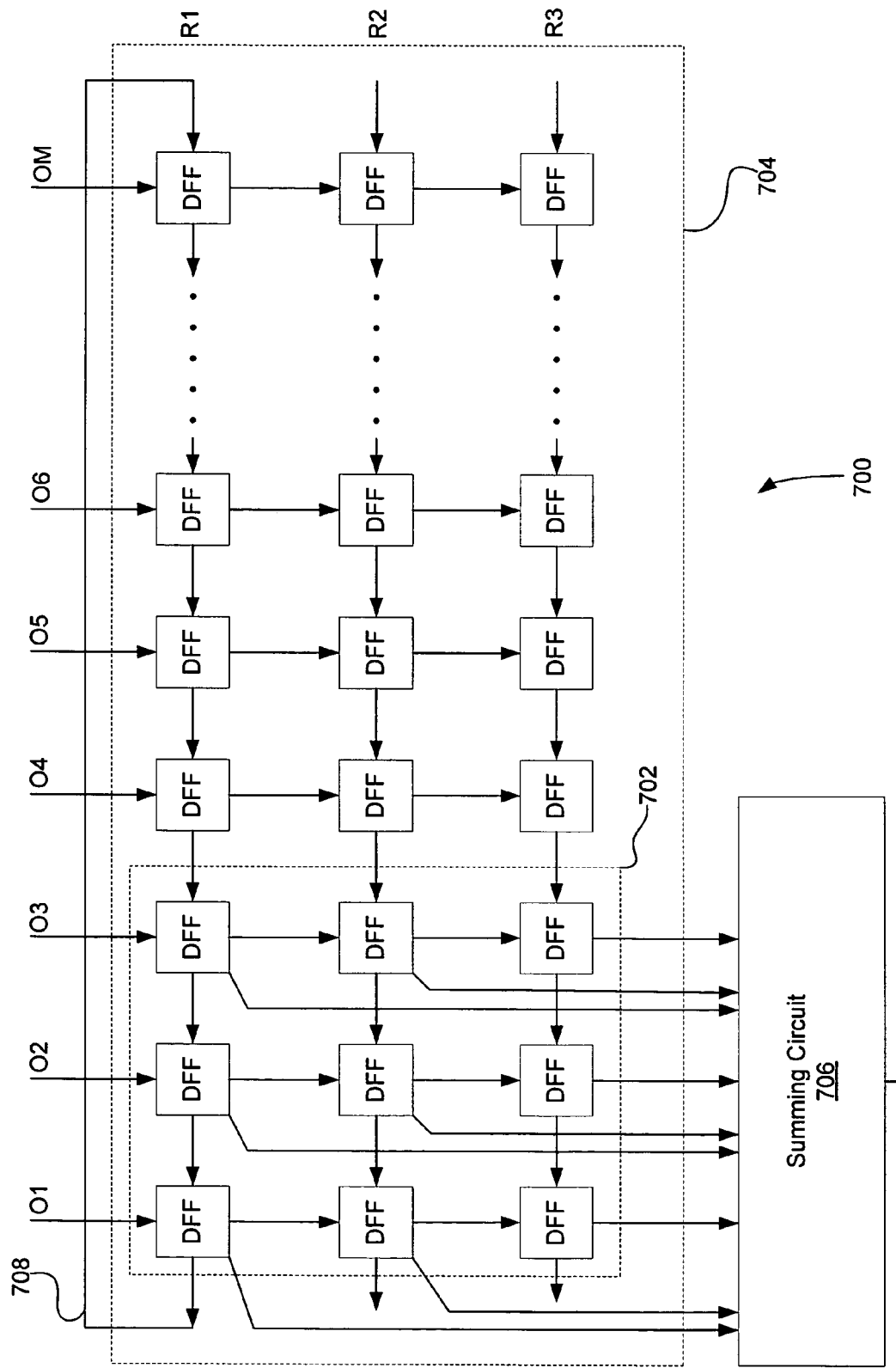
FIG. 7 is a functional block diagram of a window sum bad pixel detection circuit contained in the BIST controller of FIG. 2 according to another embodiment of the present invention.

FIG. 7 is a functional block diagram of a window sum bad pixel detection circuit 700 contained in the BIST controller 210 of FIG. 2 according to another embodiment of the present invention. In this embodiment, a group or "summing window" 702 of pixels PS in the active pixel sensor array 208 (FIG. 2) are analyzed to determine whether the total number of bad pixels within this window exceeds a threshold value, as will be explained in more detail below. The detection circuit 700 includes a Q×M array 704 of D-type flip-flops DFF, where M is the number of columns in the sensor array 210 and Q is an integer determined by the desired size of the summing window 702. In the example of FIG. 7, Q equals 3 and the size of the window 702 is a 3×3 array. The three rows of flip-flops DFF in the array 704 are designated R1-R3 in the example of FIG. 7. Other embodiments of the detection circuit 700 include different size summing windows 702 and also may include different size arrays 704 of flip-flops DFF.

The array 704 of flip-flops DFF are interconnected to perform two functions: 1) to shift data in parallel from an accessed row of pixels in the sensor array 208 (FIG. 2) into the first row R1 of the array 704 and thereafter from row R1 into row R2 and from row R2 into row R3; and 2) to serially shift data stored in flip-flops DFF of each row R1-R3. These two functions enable the circuit 700 to shift data from the sensor array 208 (FIG. 2) into the array 704 and to thereafter analyze windows of this data as these windows are shifted into the window 702, as will now be explained in more detail. A summing circuit 706 receives data from the flip-flops DFF contained in the window 702 and generates a bad pixel signal BP having a value indicating the number of bad pixels contained within the window.

The operation of the window sum bad pixel detection circuit 700 will now be described in more detail with reference to FIGS. 7, 2, and 3. Initially, the active pixel sensor array 208 is exposed to the test image 218 and corresponding data stored in each of the pixels contained in the array as previously described. At this point, a first row of pixels in the sensor array 208 is accessed and the data stored in these pixels supplied on the column lines C through the switching circuit 213 to the BIST data collection circuit 212 of FIG. 3. In response to this data, the comparators 304 in the data collection circuit 212 generate outputs O1-OM and these outputs are applied to the first row R1 of flip-flops DFF in the arrays 704. These outputs O1-OM, which indicate whether each pixel in the accessed row of pixels in the sensor array 208 is good or bad, are then stored in the first row R1 of flip-flops DFF.

A second row of pixels in the sensor array 208 is then accessed with the comparators 304 in the data collection circuit 212 generating corresponding outputs O1-OM for the second row of pixels. Before these outputs O1-OM from the second row of pixels in the sensor array 208 are stored in the first row R1 of flip-flops DFF in the array 704, the data currently stored in the first row of flip-flops is shifted into the second row R2 of flip-flops DFF in the array 704. The outputs O1-OM from the second row of pixels in the sensor array 208 are then stored in the first row R1 of flip-flops DFF in the array 704. At this point, the flip-flops DFF in the second row R2 of the array 704 store the outputs O corresponding to the first accessed row of pixels in the sensor array 208 while the flip-flops in the first row R1 of the array 704 store the outputs corresponding to the second accessed row of pixels in the sensor array 208.

Next, a third row of pixels in the sensor array 208 is accessed and the comparators 304 generate the corresponding outputs O for this third row of pixels. At this point, the outputs O stored in the second row R2 of the array 704 are shifted into the flip-flops DFF in the third row R3 of the array 704 while the output stored in the first row R1 are shifted into the second row of the array 704. The outputs O from the third row of pixels in the sensor array 208 are then shifted into the flip-flops DFF in the first row R1 of the array 704.

The array 704 now contains data from three sequentially activated rows of pixels in the sensor array 208 and windows of this data are ready to be processed via the summing circuit 706. More specifically, the summing circuit 706 initially receives the outputs O stored in the first three or three leftmost columns of flip-flops DFF in the array 704. In response to the outputs O applied to the summing circuit 706, the summing circuit generates the BP signal having a value indicating the number of bad pixels contained within the window 702 of output data. Recall, each output O from the comparators 304 indicates whether the corresponding pixel in the sensor array 208 is a good or bad pixel. As a result, the outputs O stored in the flip-flops DFF in the window 702 indicate the number of bad pixels in this corresponding window of pixels in the sensor array 208 from which these outputs were received. The pass/fail logic 214 contained in the BIST controller 210 receives and stores this BP signal from the summing circuit 706. The logic 214 could, for example, compare this BP signal to a threshold value to determine whether the number of bad pixels within this window 702 is greater than a desired threshold value.

The outputs O stored in the rows R1-R3 of the array 704 are at this point serially shifted to the left within each row R1-R3, with the output stored in each leftmost flip-flop being shifted into the rightmost flip-flop of that same row, as illustrated by the line 708 in FIG. 7. In this way, the three-by-three summing window 702 has effectively been shifted to the right relative to all outputs O stored in the flip-flops DFF of the array 704. The summing circuit 706 now operates in the same way as previously described on the new summing window to generate the BP signal indicating the number of bad pixels in this corresponding window 702 of pixels in the sensor array 208 from which these outputs were received. At this point, this new window 702 now corresponds to outputs O from pixels contained in columns 2-4 of the accessed rows of pixels in the sensor array 208. Once the summing circuit 706 has generated the BP signal for this new window 702, the pass/fail logic 214 contained in the BIST controller 210 once again receives and stores this BP signal.

At this point, the outputs O stored in the rows R1-R3 of the array 704 are once again serially shifted to the left within each row R1-R3 so that the three-by-three summing window 702 is effectively been shifted to the right so that the outputs O stored in the new window 702 now correspond to outputs O from pixels contained in columns 3-5 of the accessed rows of pixels in the sensor array 208. The summing circuit 706 generates the BP signal for this window 702 and the process once again repeats, with the outputs O stored in the rows R1-R3 of the array 704 once again being serially shifted to the left within each row R1-R3. This process repeats until all three-by-three window 702 of outputs O contained in the array 704 have been applied to the summing circuit 706 so that the corresponding BP signal for each such window has been generated. In the example of FIG. 7, there are (M-3) serial shifts of the output O data stored in the flip-flops DFF and more generally (M-Q) such serial shifts in order for all windows of output data to be applied to the summing circuit 706. The final window 702 corresponds to the output O data from the pixels in columns M, M-1, and M-2 of the sensor array 208.

Once all such serial shifts of the output O data stored in the flip-flops DFF in each row R1-R3 of the array 704 have been completed, the data is serially shifted 3 more times in the example of FIG. 7 and Q more times generally to return the output to its original locations or flip-flops DFF. The output O data in each row R1-R3 of flip-flips DFF in the array 704 is accordingly shifted M times in total so that the output data is returned to the same column in the array 704 as the column in the sensor array 208 from which it was read.

After the output O data is returned to its original locations in the array 704, a new row of pixels in the sensor array 208 is accessed. The outputs O stored in row R2 are then shifted into row R3 of the array 704 and the outputs stored in row R1 shifted into R2. The output O data from this new row of pixels in the sensor array 208 is the shifted into row R1 of the array 704. At this point, the process repeats in the same manner as just described for the new output O data stored in the array 704, with the summing circuit 706 generating BP signals for each window of this output data. Once this new array 704 of output O data has been processed, output O data from a new row of pixels in the sensor array 208 is shifted into the array 704 and the process again repeated. This process continues until the output O data for all possible 3×3 windows 702 of pixels in the sensor array 208 has been processed. The pass/fail logic 214 then takes desired action once all such summing windows 702 have been analyzed and supplies a corresponding test results signal TSTR to the external tester 202.

With the window sum bad pixel detection circuit 700, suitable control circuitry within the BIST controller 210 (FIG. 2) generates and applies control signals to the flip-flops DFF and summing circuit 706 to control these components to shift the stored data and perform the operations just described, as will be appreciated by those skilled in the art.

Figure 8:
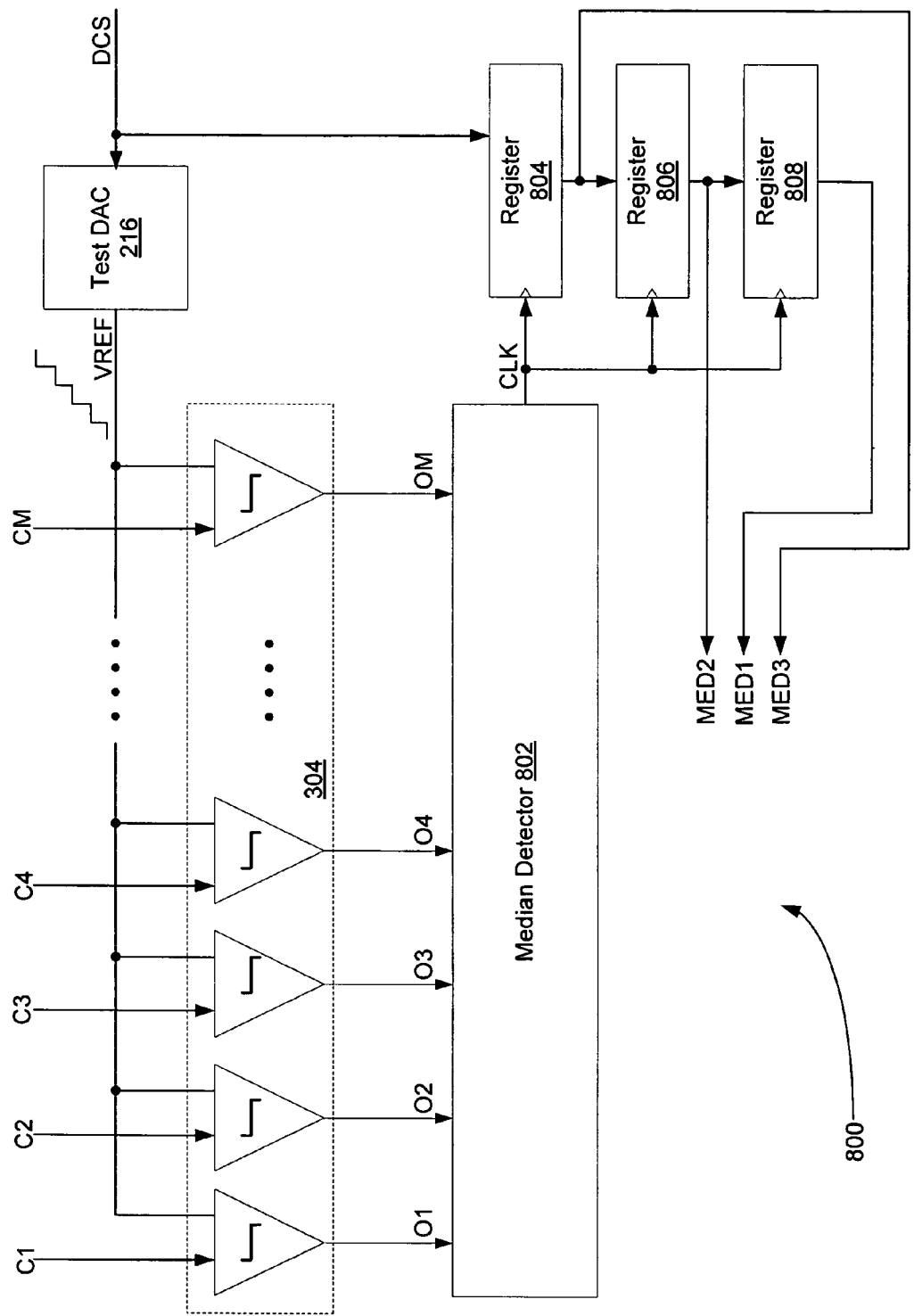
FIG. 8 is a functional block diagram of a row average fixed pattern detection circuit contained in the BIST controller of FIG. 2 according to a further embodiment of the present invention.

FIG. 8 is a functional block diagram of a row median fixed pattern detection circuit 800 contained in the BIST controller 210 of FIG. 2 according to a further embodiment of the present invention. The circuit 800 detects fixed pattern errors in the sensor array 208, where fixed pattern errors correspond to rows or columns that are relatively bright or dim when compared to neighboring or adjacent rows or columns of pixels in the sensor array 208. This embodiment utilizes the test digital-to-analog (DAC) converter of FIG. 2, and this converter along with the comparators 304 in the data collection circuit 212 are shown in FIG. 8. Each comparator 304 is shown as receiving data from the corresponding column line C1-CM via the switching circuit 213 of FIG. 3.

The BIST controller 210 (FIG. 2) applies a digital control signal DCS to the test DAC 216 to set the value of the reference voltage VREF that is applied to the comparators 304. The value of the DCS signal is sequentially incremented by a predetermined value such that the test DAC 216 adjusts the voltage VREF in a stair step manner as illustrated in FIG. 8. For each VREF value output from the test DAC 216, the comparators 304 generate corresponding outputs O1-OM. A median detector 802 receives the outputs O from the comparators 304 and determines when half the outputs have a first logic state and the other half of the outputs have the complementary logic state. This corresponds to half the pixels in the currently accessed row of pixels in the sensor array 208 being greater than VREF value corresponding to the applied DCS signal and the other half of the pixels in this accessed row of pixels being less than this threshold VREF value. When this is true, the value of the DCS signal applied to the test DAC 216 is a digital representation of the median value for the pixels in the row currently being accessed in the sensor array 208. In this way, the comparators 304, median detector 802, and test DAC 216 operat3 in combination to perform an analog-to-digital conversion of the median analog value for the pixels in the accessed row, with the DCS signal being the output of this analog-to-digital conversion.

When the median detector 802 determines that half the comparators 304 have the first logic state and half the comparators have the complementary logic state, this means the DCS signal applied to the test DAC 216 equals the median value of the pixels in the currently accessed row. At this point, the median detector 802 generates a clock signal CLK to clock this digital value of the DCS signal into a first register 804.

The test DAC 216, comparators 304, and median detector 802 then operate in the same way for the analog values output from a next row of pixels in the sensor array 208. This next row of pixels in the array 208 is a row that is physically adjacent to the prior row of pixels accessed in the array. Once again, the DCS signal is sequentially incremented and applied to the test DAC 216. The median detector 802 monitors the outputs O from the BIST comparators and determines when half these comparators have a first logic state and half have the complimentary logic state. When this is true, the median detector 802 once again generates the CLK signal to latch the value of the DCS signal at this time into the register 804. At the same time, or actually just prior to this value of the DCS signal being latched in the register 804, the current value stored in the register 804 is shifted into a register 806. In this way, the top register 804 contains the median value, which corresponds the latched value of the DCS signal, for the second accessed row of pixels in the sensor array 208 while the middle register 806 stores the DCS signal for the first accessed row of pixels in the sensor array.

At this point, the test DAC 216, comparators 304, and median detector 802 once again operate in the same way for the analog values output from a next physically adjacent row of pixels in the sensor array 208. When the median detector 802 determines that the current value of the DCS signal applied to the test DAC 216 is equal to the median analog value stored in this next physically adjacent row of pixels, the median detector 802 once again generates the CLK signal to shift the DCS value stored in the register 806 into a bottom register 808, shift the DCS value stored in the register 804 into the register 806, and to latch this new value for the DCS signal for this next physically adjacent row into the register 804.

The bottom register 808 now stores the median value for the first accessed row of pixels in the sensor array 208, with this median value being designated MED1. The middle register 806 now stores the median value for the second accessed row of pixels in the sensor array 208, with this median value being designated MED2. Finally, the top register 804 now stores the median value for the third row of pixels accessed in the sensor array 208, this median value being designated MED3. These three median values MED1, MED2, and MED3 are then output from the registers 808, 806, and 802 to the pass/fail logic 214 contained in the BIST controller 210 of FIG. 2, and this logic processes these values to determine whether any fixed pattern errors exist. In doing so, the logic 214 may compared variations in median values MED between physically adjacent rows and any variation greater than a threshold may be determined to be a fixed pattern error.

For example, if the median value MED2 stored in the register 806 for the second row of accessed pixels is much greater than the median value MED1 for the first row of pixels stored in the bottom register 808, then the entire second row of pixels may be dim relative to the first row of pixels. Presumably, in such a situation the median value MED2 stored in the middle register 806 would also be much greater than the median value MED3 for the third row of pixels stored in the top register 804. In such a situation, the second row of pixels would be a dim row of pixels creating an undesirable fixed pattern error in the sensor array 208. The pass/fail logic 214 may, in this situation, generate the TSTR signal indicating the sensor array 208 has failed the test. Conversely, the median value MED2 stored in the middle register 806 for the second row of pixels could be much less than the median values MED1 and AVG3 stored in the registers 808 and 804, which may indicate that the second row of pixels is too bright relative to the first and third rows of pixels. This situation could also present undesirable fixed pattern errors in the sensor array 208, resulting in the pass/fail logic 214 generating the appropriate TSTR signal.

Figure 9:
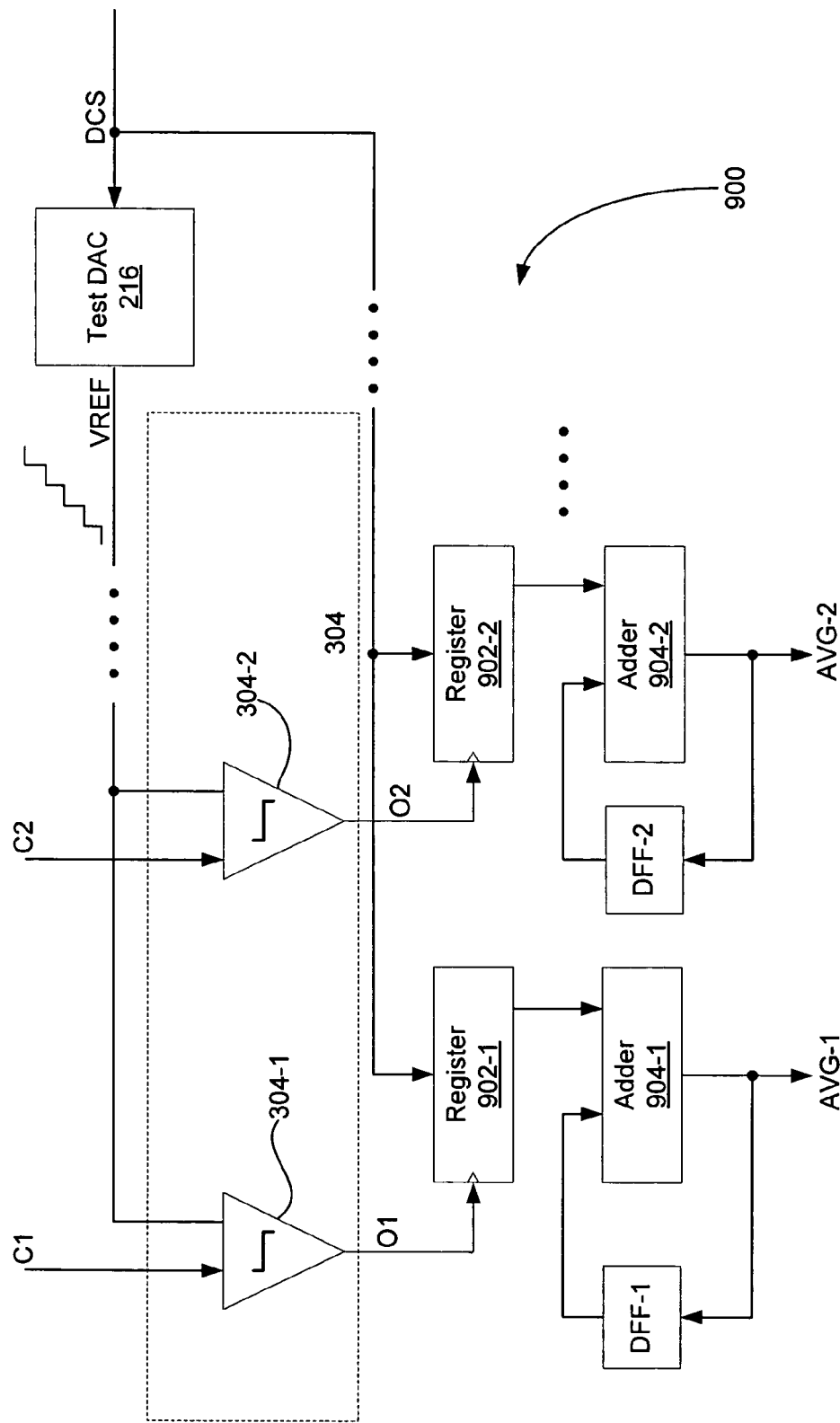
FIG. 9 is a functional block diagram of a column average fixed pattern detection circuit contained in the BIST controller of FIG. 2 according to another embodiment of the present invention.

FIG. 9 is a functional block diagram of a column average fixed pattern detection circuit 900 contained in the BIST controller 200 of FIG. 2 according to yet another embodiment of the present invention. The test DAC 216 and comparators 304 are again illustrated to better understand this embodiment. Only two columns C1 and C2 and the associated comparators 304-1 and 304-2 are shown merely to simply the figure. The test DAC 216 again receives the sequentially incremented DCS signal and generates the corresponding stair step VREF voltage. A given row of pixels in the sensor array 208 (FIG. 2) is accessed and the corresponding analog values stored in each pixel applied on the corresponding column line C. The outputs O of the comparators 304 are applied to clock corresponding registers 902 as shown for the comparators 304-1 and 304-2 which have their respective outputs O1 and O2 applied to clock the registers 902-1 and 902-2.

The operation of the column average fixed pattern detection circuit 900 is similar to the operation of the row average fixed pattern detection circuit 800 of FIG. 8. As a result, the operation of the circuit 900 is not described in as much detail as was the circuit 800 but those skilled in the art will understand the operation of the circuit 900 from this description. In operation, the DCS signal applied to the test DAC 216 is again sequentially incremented. Each comparator 304 activates its output O only when the applied DCS signal exceeds the analog voltage value from the corresponding pixel on the associated column line C. As a result, when the DCS signal exceeds the voltage on the associated column line C, the comparator 304 activates the corresponding output O to clock the corresponding register 902 and thereby latch this value for the DCS signal into the register. Thus, for each row of pixels in the sensor array 208, a corresponding value for the DCS signal of a pixel in a corresponding column in that row is latched for in each register 902.

For each column of pixels, this DCS value stored in the register 902 is output to a corresponding adder 904 which adds this value to an average value AVG input to the adder from a flip-flop DFF. The current value stored in each register 904 is output as the corresponding average value AVG and this value is fed back through the flip-flop DFF and input to the register. In this way, the register 904 keeps a running sum of the values for the DCS signals latched for the pixels in the associated column of pixels. Once all rows of pixels in the sensor array 208 have been accessed, and the value of the DCS signal for pixels in each column of this accessed row latched in the registers 902, each adder 904 outputs a sum of the values of the DCS signals for every pixel in the corresponding column of pixels. This sum divided by the number of rows of pixels in the sensor array 208 gives an average value for the DCS signal for that column, which as discussed with reference to FIG. 8 indicates the average analog value stored for the pixels in that column. These averages can then be compared in a manner analogous to that discussed with reference to FIG. 8 to detect bright or dim columns of pixels in the sensor array 208, as will be appreciated by those skilled in the art.

Figure 10:
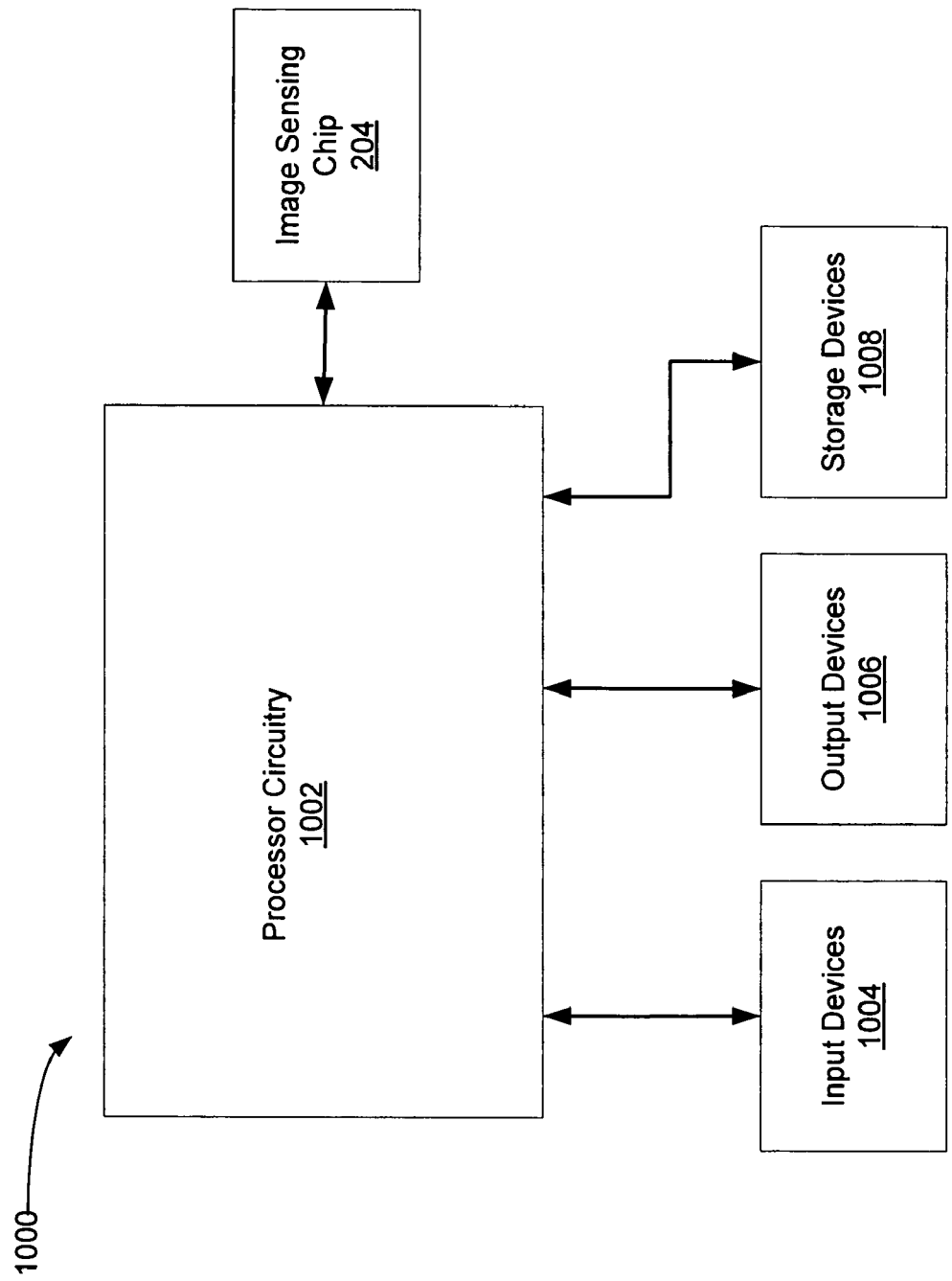
FIG. 10 is a functional block diagram illustrating an electronic device including the image sensing chip of FIG. 2 according to another embodiment of the present invention.

FIG. 10 is a functional block diagram illustrating an electronic device 1000 including the image sensing chip 204 of FIG. 2 according to another embodiment of the present invention. The electronic device 1000 includes processor circuitry 1002 coupled to the image sensing chip 204. The processor circuitry 1002 typically includes circuitry for performing various computing and signal processing functions, such as executing specific software to perform specific calculations or tasks and processing signals received from the image sensing chip 204. In addition, the electronic system 1000 includes one or more input devices 1004 coupled to the processor circuitry 1002 to allow an operator to interface with the electronic system. The input devices 1004 may include a keyboard, mouse, numeric key pad, and other suitable input devices.

Typically, the electronic system 1000 also includes one or more output devices 1006 coupled to the processor circuitry 1002, such output devices including a liquid crystal display (LCD) or other type of visual display, a printer, and other suitable devices. One or more data storage devices 1008 are also typically coupled to the processor circuitry 1002 to store data or retrieve data from external storage media (not shown). Examples of typical storage devices 1008 include FLASH memory chips and cards, hard and floppy disks, tape cassettes, compact disks (CDs) and digital video disks (DVDs). The device 1000 may be, for example, a cellular telephone, a digital still camera, or a digital video camera.

Even though various embodiments of the present invention have been set forth in the foregoing description, the above disclosure is illustrative only, and changes may be made in detail and yet remain within the broad principles of the present invention. Moreover, the functions performed by components in any of the figures can be combined to be performed by fewer elements, separated and performed by more elements, or combined into different functional blocks depending upon a variety factors associated with a particular system being designed, as will be appreciated by those skilled in the art. Furthermore, some of the components described above may be implemented using either digital or analog circuitry, or a combination of both, and also, where appropriate, may be realized through software executing on suitable processing circuitry. Therefore, the present invention is to be limited only by the appended claims.

What is claimed is:

1. An image sensing chip, comprising:
    an active pixel sensor array including a plurality of pixels arranged in rows and columns; and
    a built in self test circuit coupled to the active pixel sensor array, the built in self test circuit including:
    a controller adapted to be coupled to external circuitry through a programming port, wherein the controller is configured to be programmed to perform desired tests on the active pixel sensor array in response to receiving programming signals from the external circuitry through the programming port;
    a data collection circuit coupled to column lines of the active pixel sensor array and adapted to receive a reference voltage, the data collection circuit operable for each accessed row of pixels in the sensor array to compare a voltage developed on each column line to the reference voltage and to generate corresponding output signals indicating whether the voltages on the respective column lines are less than or greater than the reference voltage; and
    wherein the controller is coupled to the data collection circuit and to the output port and the controller is operable to process the output signals from the data collection circuit and generate a test results signal indicating whether the sensor array has passed or failed a test;
    a test digital-to-analog converter coupled to the data collection circuit and operable to develop the reference voltage having a stair-step characteristic responsive to a digital control signal;
    a plurality of registers, each register coupled to receive the digital control signal and coupled to the data collection circuit to be clocked by a corresponding output signal;
    an addition circuit having a first input coupled to the register and having a second input, the addition circuit operable to sum values on the first and second inputs and output an average value; and
    a register coupled to the addition circuit to receive the average value and operable to provide the average value on the second input.

2. The image sensing chip of claim 1 wherein the data collection circuit comprises a plurality of comparators.

3. The image sensing chip of claim 1 wherein the controller comprises a digital summing circuit coupled to the data collection circuit to receive the output signals and operable to generate for each row of accessed pixels in the sensor array a bad pixel signal from the output signals, the bad pixel signal indicating the number of bad pixels contained in the corresponding accessed row of pixels.

4. The image sensing chip of claim 1 wherein the controller comprises a digital summing circuit coupled to the data collection circuit to receive the output signals and operable to generate for each row of accessed pixels in the sensor array a bad pixel signal from the output signals, and further operable to generate a bad pixel total signal from the bad pixel signals generated for all rows in the sensor array.

5. The image sensing chip of claim 1 wherein the controller comprises a plurality of digital summing circuits, each digital summing circuit coupled to the data collection circuit to receive a corresponding output signal and operable to generate for each column of pixels in the senor array a bad pixel per column signal from the output signals generated for all pixels in that column.

6. The image sensing chip of claim 1 wherein the controller comprises an array of storage elements that are operable to store output signals from the data collection circuit for multiple rows of accessed pixels in the sensor array and further operable to generate a bad pixel signal for windows of output signals stored in the array of storage elements.

7. The image sensing chip of claim 1 wherein the active pixel sensor array comprises a CMOS sensor array.

8. An electronic device, comprising:
    at least one input device;
    at least one output device;
    at least one storage device; and
    processing circuitry coupled to the input, output, and storage devices, and coupled to an image sensing chip, the chip including,
    an active pixel sensor array including a plurality of pixels arranged in rows and columns; and
    a built in self test circuit coupled to the active pixel sensor array, the built in self test circuit including an output port coupled to the external tester and the built in self test circuit operable to test the active pixel sensor array and provide the results of the test on the output port,
    wherein the built in self test circuit includes:
    a controller adapted to be coupled to the external tester through a programming port, and wherein the controller is configured to be programmed to perform desired tests on the active pixel sensor array in response to receiving programming signals from the external tester through the programming port;
    a data collection circuit coupled to column lines of the active pixel sensor array and adapted to receive a reference voltage, the data collection circuit operable for each accessed row of pixels in the sensor array to compare a voltage developed on each column line to the reference voltage and to generate corresponding output signals indicating whether the voltages on the respective column lines are less than or greater than the reference voltage; and wherein the controller is coupled to the data collection circuit and to the output port and the controller is operable to process the output signals from the data collection circuit and generate a test results signal indicating whether the sensor array has passed or failed a test;

a test digital-to-analog converter coupled to the data collection circuit and operable to develop the reference voltage having a stair-step characteristic responsive to a digital control signal; and a median detector coupled to the data collection circuit to receive the output signals, the median detector operable for sequentially accessing physically adjacent rows of pixels in the sensor array to determine when half of the output signals have a first logic state and the other half have the complementary logic state, and operable to store for each such row, the value of the digital control signal when this determination is true, and further operable to process the stored digital control signals to detect fixed pattern error in the sensor array.

9. The electronic device of claim 8 wherein the electronic device is coupled to an external test for testing the sensor array.

10. The electronic device of claim 8 wherein the processing circuitry, input devices, output devices, and storage devices include circuitry that cause the device to function as one of one of a cellular telephone, a digital still camera, and a digital video camera.

11. A method of testing an active pixel sensor array formed in a semiconductor chip, the array including a plurality of pixels arranged in rows and columns and the method including:

generating test control signals on the chip;

programming a controller on the chip to perform desired tests on the sensor array, the controller being programmed by programming signals received from external circuitry through a programming port;

testing the sensor array by the controller in response to receiving the programming signals including:

accessing rows of pixels in the array;

comparing a voltage developed for each accessed pixel in each row to a reference voltage; and developing a digital signal having either first or second logic state responsive to the operations of comparing generating the reference voltage having a stair-step characteristic responsive to a digital control signal;

selectively storing respective values of the digital control signal for each column responsive to the respective digital signals developed responsive to the operations of comparing;

summing, for each column, the respective stored signals to generate an average value for each column; and providing by the controller to the external circuitry a test results signal from the chip indicating the result of the operation of testing the sensor array.

12. The method of claim 11 wherein testing the sensor array comprises performing on the chip a window sum test of pixels in the array using the digital signals.

13. The method of claim 11 wherein testing the sensor array comprises:

exposing the array to a test image; and performing on the chip column sum and/or row sum testing of the pixels in the sensor array using the digital signals.

* * * * *